United States Patent [19]

Seguin et al.

[11] Patent Number: 4,837,252

[45] Date of Patent: Jun. 6, 1989

[54] POLYMER-ASPHALT MIXING PROCESS

[75] Inventors: Frederick P. Seguin, Sarnia, Canada; Michel Longuet, Strasbourg, France

[73] Assignee: Polysar Limited, Sarnia, Canada

[21] Appl. No.: 132,280

[22] Filed: Dec. 14, 1987

[51] Int. Cl.$^4$ .......................... C08J 3/22; C08J 23/04; C08J 23/16; C08J 95/00

[52] U.S. Cl. ........................ 523/351; 524/68; 524/70; 524/71; 524/62; 524/424; 524/425; 524/426; 524/427

[58] Field of Search ............... 524/68, 70, 71, 62; 523/351

[56] References Cited

U.S. PATENT DOCUMENTS

| | | |
|---|---|---|
| 3,700,514 | 2/1974 | Wahlborg .................. 524/70 |
| 3,963,659 | 6/1976 | Binder et al. . |
| 4,069,181 | 1/1978 | Healy et al. . |
| 4,081,502 | 3/1978 | Blumel et al. . |
| 4,490,493 | 12/1984 | Mikols . |

*Primary Examiner*—Allan M. Lieberman
*Attorney, Agent, or Firm*—Stevens, Davis, Miller & Mosher

[57] ABSTRACT

The present invention provides a process for the preparation of polymer modified asphalt compositions.

3 Claims, No Drawings

POLYMER-ASPHALT MIXING PROCESS

FIELD OF THE INVENTION

This invention relates to a two stage mixing process to prepare polymer modified asphalt compositions.

BACKGROUND OF THE INVENTION

Asphalt is used in a diverse variety of construction applications, such as road building and roofing. The physical properties of raw asphalt, particularly at low and high temperatures, are frequently deficient in one or more aspects. Thus, a great deal of time and effort has been expended in the development of polymer modified asphalt compositions, which compositions often exhibit surprisingly improved properties.

However, it is frequently not a simple matter to prepare polymer modified asphalt. Some polymers, especially elastomers, are difficult to disperse in asphalt. Standard asphalt mixing equipment, such as a batch kettle equipped with a paddle stirrer, provides relatively low shear and is, therefore, not suited to quickly disperse elastomers in asphalt. One known solution to this problem is to grind the elastomer into a fine powder before adding it to the asphalt. This solution does provide good dispersion of the elastomer but it is relatively expensive, due to the cost associated with grinding the elastomer (i.e. powdered rubber is sold at a substantial price premium in comparison to rubber which is sold in a standard bale form).

Other attempts have been made to develop a more economical process to prepare rubber modified asphalt. U.S. Pat. No. 3,963,659 describes a process in which a rubber and asphalt are mixed in a masticator, with the asphalt being added to the masticator over an extended period of time. As the asphalt concentration increases, the composition tends to become sticky and, therefore, the asphalt is either added in a slow continuous manner, or in small incremental charges. The process is clearly inconvenient and time consuming.

U.S. Pat. No. 4,081,502 teaches a process which overcomes some of the problems of the process of U.S. Pat. No. 3,963,659. Specifically, U.S. Pat. No. 4,081,502 teaches the use of a kneader to mix crumbs, granules or powder of polymer with asphalt. However, the mixtures are sticky and are prone to adhere to the kneader, thus requiring a time consuming cooling step as an essential element of the process. In the absence of this cooling step, substantially more than 5% of the mixture adheres to the kneader.

A fundamentally different approach to dealing with this mixing problem is suggested by U.S. Pat. No. 4,490,493, namely, the selection of compatible asphalt-polymer systems. However, the teachings of this patent are not particularly helpful to a person who would like to incorporate ethylene-propylene polymers into asphalt.

In summary, a person who is interested in directly incorporating raw ethylene-propylene rubber into asphalt is generally faced with a difficult dispersion problem. Attempts have been made to improve the dispersion of rubber into asphalt by developing processes to premix some of the asphalt with rubber, but such processes have not been entirely satisfactory. Thus, the processes of the prior art are encumbered by one or more expensive or inconvenient steps.

SUMMARY OF THE INVENTION

It is an object of the present invention to provide a convenient, two stage mixing process for the incorporation of ethylene-propylene elastomer into asphalt which may be completed by using standard rubber mixing equipment in the first stage and standard asphalt mixing equipment in the second stage.

Accordingly, there is provided a two stage mixing process for preparing polymer modified asphalt compositions, the process consisting of:

(A) a first stage comprising the steps of
  (i) forming a low asphalt masterbatch by adding 100 parts by weight of ethylene-propylene elastomer, 20 to 50 parts by weight of asphalt and 10 to 100 parts by weight of a thermoplastic polyolefin to a rubber mixer and mixing at a temperature which is high enough to at least soften the thermoplastic polyolefin,
  (ii) discharging the polymer masterbatch from the rubber mixer; and
(B) a second stage comprising adding the polymer masterbatch to heated asphalt in an asphalt mixer, and mixing the polymer masterbatch with the heated asphalt.

DETAILED DESCRIPTION

Suitable ethylene-propylene elastomers include ethylene-propylene rubbers, which are commonly referred to as EP rubbers, and ethylene-propylene-"diene" rubbers, which are commonly referred to as EPDM rubbers (and wherein the term "diene" refers to an unconjugated olefin such as dicyclopentadiene, 2-methylenenorbornene or 1 to 4 hexadiene). These well known elastomers generally contain 45 to 75 mole per cent ethylene and 25 to 55 mole per cent propylene, and 2 to 5 weight per cent diene and have a Mooney viscosity (ML 1+4 at 100° C.) of from 30 to 100. EP rubbers having 68–70 mole per cent ethylene, 32 to 30 mole per cent propylene, and a Mooney viscosity of 34–38 are particularly preferred.

Thermoplastic polyolefins are also used in the process of the present invention. Suitable thermoplastic polyolefins comprise solid products from the polymerization of one or more monoolefins by either a low or high pressure polymerization process. Preferred examples include commercially available polyethylene or polypropylene resin, but the exact type of such resin is not critical to the success of the present process.

The term asphalt is meant to refer to its well known meaning, which encompasses a large genus of hydrocarbon materials. Particularly suitable examples of asphalt for use in the present invention include the residue derived from the treatment of certain petroleum products - such as thermal asphalts, air blown asphalts, non-blown asphalts and "native" asphalts such as gilsonite and Trinidad asphalt.

Asphalts are frequently characterized by a penetration value which is measured according to a test defined by ASTM D5. Preferred penetration values are from 85 to 300, especially 200 to 250.

Conventional additives, fillers and plasticizers may also be included, in normal quantities, in the compositions produced according to the process of the present invention. Conventional additives, as disclosed, for example, in U.S. Pat. No. 4,069,181, include stearic acid, zinc stearate and plasticizers. Extender oils, such as naphthenic and paraffinic oils, are well known plasticizers. Additives and plasticizers are preferably added during the preparation of the masterbatch in the first stage of the present process, whereas the fillers are preferably added during the second stage. Examples of suitable fillers include chalk, mica, lime and carbon black, and are often used in an amount of from 10–30 weight per cent of the final composition.

The first stage of the present process produces a masterbatch composition and is completed in standard rubber mixing equipment, such as banbury mixers and mill mixers. The first stage is completed at a temperature sufficient to at least soften the thermoplastic, preferably from 100° to 200° C. It is preferred that the temperature be high enough to melt the thermoplastic. It is especially preferred to use at least 30 parts by weight of the thermoplastic per 100 parts by weight of the ethylene-propylene elastomer.

The masterbatch composition which is mixed in the first stage of the present process contains 100 parts by weight ethylene-propylene polymer, 10 to 100 parts by weight of thermoplastic olefin and 20 to 50 parts by weight asphalt. Thus, the masterbatch composition contains only a minor portion of asphalt. It has been found that this masterbatch composition is not prone to stick to the rubber mixing equipment, thus allowing it to be conveniently mixed in and discharged from such equipment. Therefore, the first stage of the present process may be completed at a central facility which is equipped with conventional rubber mixing equipment. The masterbatch may be stored for a period of time, or it may be immediately used in the second stage of the process.

Although the masterbatch contains only a minor amount of asphalt, it displays properties which are surprisingly different from the base ethylene-propylene polymer. For example, the masterbatch is softer and more easily drawn in comparison to the base ethylene-propylene polymer. Furthermore, the masterbatch is easily extruded through a die, which permits the production of masterbatch pellets in an extruder fitted with a die plate and cutter. Since, small particles are more easily dispersed in subsequent mixing operations, the masterbatch is preferably cut into small pellets.

The masterbatch is added to heated asphalt in the second stage of the process. Standard asphalt mixing equipment, such as a kettle equipped with a low speed paddle mixer, is suitable for this mixing stage. The second stage may be completed either immediately following the first stage, or at a later time and place. For example, it will be apparent that the second stage of the present process could be completed at a construction site, since the only equipment which is absolutely required at this point is an asphalt mixer.

The masterbatch is more easily incorporated into the liquid asphalt in comparison to the raw ethylene-propylene elastomer. While not wishing to be bound by any theories, it would seem probable that the relatively high shear which is provided by the rubber mixing equipment results in a good initial dispersion of the polymer in the asphalt contained in the masterbatch, thus allowing the use of a relatively low shear asphalt mixer to complete the mixing process. Furthermore, it is also probable that the asphalt which is present in the masterbatch will cause some swelling of the polymer, since certain of the hydrocarbon constituents of asphalt are known to have a swelling effect on non-polar polymers. While not wishing to be bound by any theories, it is probable that this swelling effect contributes to the subsequent ease of incorporation of the masterbatch into further asphalt.

The masterbatch is added to heated asphalt in order to start the second stage of the present process. The asphalt may be contained in a standard asphalt mixer and preferably will be at a temperature of from 170° to 200° C. The length of time required to disperse the masterbatch in the asphalt is dependent upon agitator design, revolution speed of the agitator, and mixing temperatures. High speed, high shear mixers will quickly disperse the masterbatch, but such mixers are quite expensive. Less expensive, low shear mixers, which frequently will not adequately disperse elastomers in asphalt in a reasonable period of time, may also be used to complete the second stage mixing.

The amount of masterbatch which is added to the asphalt will affect the properties of the final composition. In many applications, the amount of polymer which is contained in the final composition will be specified, for example, in a contract relating to the installation of polymer modified asphalt. Thus, a person skilled in the art, knowing the polymer concentration of the masterbatch may readily calculate the amount of masterbatch which must be added to a given amount of asphalt to meet the specification. Typically, a final modified asphalt composition will contain from 2 to 12 weight per cent polymer. Further details of the invention are illustrated by the following, non-limiting examples.

EXAMPLE 1

In this and the following examples, the components used are identified in Table 1.

TABLE 1

| | |
|---|---|
| EP: | an EP rubber having 69 weight percent ethylene, 31 weight percent propylene and a Mooney viscosity (ML 1 + 4 at 100° C.) of 36. This rubber was commercially available from Polysar Incorporated, Stow, Ohio, under the designation POLYSAR ® EPM 306. |
| PE: | high density polyethylene hompolymer. This polyolefin was commercially available from Dow Chemical under the designation PE 36056. |
| Oil: | a naphthenic extender oil |
| Asphalt: | non-blown asphalt having a 200–250 penetration grade |
| Filler 1: | calcium carbonate |
| Filler 2: | talc (magnesium carbonate) |

The first stage of the mixing process of the present invention is illustrated by Example 1.

The first stage of mixing was completed in a relatively small banbury mixer (3D size) at 77 rpm, using the components shown in Table 2.

The ingredients shown in Part A were added at zero minutes with the temperature at 127° C.±5° C. Bales of the EP rubber were used, but they were slabbed into approximately 10 lb. pieces for convenience.

At between 3 and 4 minutes, Part B was added and mixing continued. After approximately one more minute, Part C was added. Mixing was continued for a further two minutes and the resulting masterbatch was then immediately dropped (i.e. discharged) from the banbury. The drop temperature was approximately 163° C. Thus, standard rubber mixing equipment was used with conventional mixing operations. The masterbatch was dropped at about the final mixing temperature and did not adhere to the mixer.

The masterbatch was subsequently formed into pellets as follows. Firstly, the masterbatch was sheeted on a conventional two roll mill. Secondly, the sheeted material was comminuted in a dicer, to provide masterbatch pellets of approximately 0.5 cm diameter.

TABLE 2

|  | Amount |
|---|---|
| PART A | |
| EP | 53 lbs. |
| PE | 33 lbs. |
| PART B | |
| Asphalt | 10 lbs. |
| Oil | 10 lbs. |
| PART C | |
| Asphalt | 10 lbs. |
| Oil | 10 lbs. |
| Filler 2 | 7 lbs. |

EXAMPLE 2

This example illustrates the second stage of the present process.

168 pounds of masterbatch pellets, prepared according to the first stage mixing process described in Example 1, were added to 623 pounds of heated asphalt and 200 pounds of lime filler.

Initially, the asphalt was added to a low speed, low shear asphalt mixer and heated to 180°-200° C. The asphalt was stirred at between 30-60 rpm while the masterbatch pellets were added to the asphalt. The pellets were continuously added over a period of 1-2 minutes to prevent an agglomeration from forming.

The composition was stirred for approximately 3 hours to provide a good dispersion of the pellets. Subsequently, 200 pounds of lime filler was added. Again, the filler was added gradually over a period of 2-3 minutes to avoid agglomeration. The mixture was stirred for a further period of approximately 1 hour, to disperse the filler, thus providing a final polymer modified asphalt composition.

EXAMPLE 3

The physical properties of the final polymer modified asphalt composition of Example 2 were measured using generally recognized procedures. Where applicable, similar measurements were made on the base asphalt. The resulted are compiled in Table 3.

TABLE 3

|  | Polymer Modified Asphalt | Base Asphalt |
|---|---|---|
| Softening Point[1] | 125° C. | 35-40° C. |
| Penetration | | |
| (25° C.)[2] | 42 dmm | 182 dmm |
| (4° C.) | 40 dmm | 56 dmm |
| Elongation at Break | 400% | not meaningful |
| Viscosity (poise)[3] | 160 | 566[3a] |
| Toughness, tenacity[4] | 2.8 J | not meaningful |
| Specific gravity | 1.01 | 1.02 |
| Low temp. brittle point[5] | −20° C. | 0 to 5° C. |
| Flow at 20° C. | 0 | not meaningful |

[1]ASTM D36 (Ring and ball)
[2]ASTM D5
[3]Measured at 180° C.
[3a]measured at 60° C.
[4]Canadian General Standards Bureau 37 GP50 M
[5]Canadian General Standards Bureau 37 GP56 M

What is claimed is:

1. A two stage process for preparing a polymer modified asphalt composition, said process consisting of:
   (A) a first stage comprising forming a low asphalt masterbatch by (i) providing a composition comprising 100 parts by weight of ethylene-propylene elastomer, having from 45 to 75 mole per cent ethylene, 20 to 50 parts by weight of asphalt, 10 to 100 parts by weight of a thermoplastic polyolefin, 10 to 50 parts by weight napthenic oil and 8 to 20 parts by weight filler, (ii) mixing said composition in standard rubber mixing equipment at a temperature high enough to at least soften said thermoplastic polyolefin, and (iii) discharging said composition from said rubber mixer; and
   (B) a second stage comprising adding said masterbatch to heated asphalt in an asphalt mixer, and mixing said masterbatch with said heated asphalt, wherein said polymer modified composition contains from 2 to 25 weight per cent of said masterbatch.

2. The process according to claim 1 wherein said ethylene-propylene elastomer comprises EP rubber and said thermoplastic polyolefin comprises high density polyethylene.

3. The process according to claim 2 wherein said EP rubber comprises 68 to 70 weight per cent ethylene, 30 to 32 weight per cent propylene and has a Mooney viscosity of 34 to 38.

* * * * *